(12) United States Patent
Carson, Jr. et al.

(10) Patent No.: US 8,095,966 B1
(45) Date of Patent: Jan. 10, 2012

(54) METHODS AND APPARATUS FOR PASSWORD MANAGEMENT

(75) Inventors: Keith Alan Carson, Jr., Hopkinton, MA (US); Svetlana Patsenker, Wayland, MA (US); Venkata R. Tiruveedi, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 1099 days.

(21) Appl. No.: 11/477,058

(22) Filed: Jun. 28, 2006

(51) Int. Cl.
*G06F 17/30* (2006.01)

(52) U.S. Cl. .......................................................... 726/5

(58) Field of Classification Search ................ 713/155, 713/161–168; 726/1–6; 380/30, 277; 705/26, 705/27, 39, 40, 44, 50, 51, 65, 67, 71, 75, 705/76

See application file for complete search history.

(56) References Cited

U.S. PATENT DOCUMENTS

| | | | | |
|---|---|---|---|---|
| 4,933,969 A | * | 6/1990 | Marshall et al. ............... | 713/177 |
| 5,410,598 A | * | 4/1995 | Shear ............................. | 713/194 |
| 5,495,533 A | * | 2/1996 | Linehan et al. ................ | 713/155 |
| 5,509,074 A | * | 4/1996 | Choudhury et al. ........... | 713/176 |
| 5,657,388 A | * | 8/1997 | Weiss ............................. | 713/185 |
| 5,812,764 A | * | 9/1998 | Heinz, Sr. ........................ | 726/5 |
| 6,029,150 A | * | 2/2000 | Kravitz .............................. | 705/75 |
| 6,044,155 A | * | 3/2000 | Thomlinson et al. .......... | 713/155 |
| 6,253,324 B1 | * | 6/2001 | Field et al. ...................... | 713/187 |
| 6,272,631 B1 | * | 8/2001 | Thomlinson et al. .......... | 713/155 |
| 7,571,467 B1 | * | 8/2009 | Priestley et al. .................. | 726/6 |
| 2005/0065889 A1 | * | 3/2005 | Benaloh ............................ | 705/51 |

\* cited by examiner

*Primary Examiner* — Brandon Hoffman

(74) *Attorney, Agent, or Firm* — Krishnendu Gupta; Gerald P. Kazanjian

(57) ABSTRACT

A SAN management application stores a password file in a secure repository inside a database to which the stored passwords provide access. A separate database account (i.e. login) is created to afford access to the password repository. The password repository, typically a database table or file, is stored in a secure area accessible only by the specialized password account. A separate password, or access token, is employed for access to the password repository account. Executable entities, such as processes of the management application, are encoded with the password, or access token, to the password repository account. From the password account, the password repository provides availability to the stored passwords for specific privileged access by designated processes. In this manner, a dual level authorization is provided to privileged database operations, and corresponding logic embedded in particular processes authorized to traverse both levels.

20 Claims, 6 Drawing Sheets

METHODS AND APPARATUS FOR PASSWORD MANAGEMENT

BACKGROUND

In a storage area network (SAN), a SAN management application monitors and manages manageable entities in the SAN. A management server executes the SAN management application. The management server is responsive to a console having a graphical user interface (GUI) for receiving and displaying operator parameters with a SAN operator. The management application employs a database for storage of various tables including both user data and administrative data. The administrative data includes various operating parameters, and affords substantial control over the database. Further, the database is typically managed by a separate application, or database management system, produced by a third party commercial vendor. Database usage is therefore integrated with the SAN management application by way of a database engine specialized and optimized for use with the SAN management application.

The database engine, therefore, is licensed and bundled with the SAN management application. The database engine provides administrative services and operations, such as access control, organization, and indexing, to name several. In particular, the database safeguards the data by a mechanism of login access control and corresponding account, each having privileges to access particular portions of the database. In particular, access to administrative data is limited and safeguarded in order to maintain the specific scope and optimization of the specialized database engine for use with the SAN management application. Account access is typically provided by password authentication. In an integrated software environment, such as the database engine integrated with the SAN management application, SAN management applications performs logins into the database via the database engine to access parts of the database appropriate to the particular executable object or application within the SAN management application. The SAN management application obtains a password expected by the database engine. Such passwords may be stored in various locations, such as files or tables, known to the SAN management application, to enable password authentication and database access (login) via a database engine account.

SUMMARY

Conventional database access mechanisms employ a password to access privileged database operations. Privileged operations are typically accessed and performed by an experienced database administrator, and provide substantial freedom for executing database functions. In particular implementations, due to licensing or user proficiency issues, access to privileged database functions may be restricted. Typical restriction mechanisms include privileged login accounts for accessing sensitive database areas or functions. An encrypted password is employed for login to such privileged accounts. Further, privileged logins may be performed by executing software applications, rather than by interactive users. Privileged applications are operable to access and/or obtain a password to a privileged account, and access the sensitive database areas and operations using the privileged account once access is obtained via the password.

Conventional privileged accounts employed for sensitive or proprietary database access suffer from the shortcoming that access control may be compromised should the password be divulged or obtained outside the intended access group. One conventional mechanism is to store passwords in a file accessible to applications operable to read the file and employ the retrieved password for privileged database access. Configurations herein are based in part, on the observation that such password files are often stored in common access locations, to facilitate access to applications which employ the passwords therein. Such access mechanisms may encrypt or encode the password in the file such that the accessing applications employ decryption or decoding logic to recover the password. However, techniques such as reverse engineering and cryptography may be employed to intercept the password by unintended third parties.

Accordingly, configurations herein substantially overcome the shortcomings with conventional password files by storing the password file in a secure repository (password repository) inside the database to which the stored passwords provide access. A separate database account (i.e. login) is created to afford access to the password repository. The password repository, typically a database table or file, is stored in a secure area accessible only by the specialized password account. A separate password, or access token, is employed for access to the password repository account. Executable entities, such as processes of the management application, are encoded with the password (i.e. access token) to the password repository account. From the password account, the password repository provides availability to the stored passwords for specific privileged access by designated processes. Individual passwords available via the password repository may be further refined in granularity, but are accessible only via the password account. Individual executable entities (i.e. processes) operable for privileged access have embedded logic for both the access token used to access the password repository, and decryption logic for decrypting or decoding the password once obtained from the password repository. In this manner, a dual level authorization is provided to privileged database operations, and corresponding logic (instructions) therefore embedded in particular processes authorized to traverse both levels, thus preventing unauthorized access in the event or reverse engineering, malicious cryptography, or other compromise of the password decrypting/decoding logic. Password integrity is preserved by storing the password repository including encrypted passwords in a privileged database area accessible only via the privileged password repository account to the database.

In further detail, the method for selective database access in a storage area network as defined herein includes encoding an access token in an executable object, such that the access token is accessible via execution of the executable object, and accessing a security repository using the access token, in which the security repository is disposed in a secure environment inaccessible without the access token. The executable object retrieves an access key from the security repository, and computes a password using the retrieved access key. The executable object then accesses a privileged account in the database using the computed password.

The method encodes the access key in the executable object, such that the executable object is operable to extract the access token and employ the access token to access the security repository. The executable object is selectively operable with privileges, and is invoked upon a request to execute the executable object. A login operation to the DB engine authenticates the requestor issuing the request, in which authentication is indicative of privileges to execute the executable object. Accordingly, the DB engine permits, if authenticating results in a positive authorization, execution of the executable object, and denies, if the authentication fails, execution of the executable object. The secure environment therefore defines a privileged account providing an access control mechanism operable for accessing the security repository (i.e. password repository), and restricting access to other database areas.

In the exemplary configuration, in which the database provides an access controlled environment, the security repository and the database are disposed in the secure environment, such that the access token provides access only to the security repository and the password provides access to the database. Computing the password further includes invoking a privileged set of instructions in the executable object including a decrypting operation, and applying the decrypting operation to the retrieved access key (encrypted password). The access token only avails access to the encrypted passwords in the security repository, or password file. The privileged set of instructions therefore further defines an executable object embedded with the privileged set of instructions. The secure environment further includes a set of database tables responsive to a database management system (DBMS), the DBMS operable to access tables according to a predetermined access control mechanism. The database includes a plurality of tables, the tables protected by database access control, the access key stored in a key table. The key table includes a plurality of access keys, each access key affording a predetermined access level corresponding to the particular access key. In the exemplary configuration, the access key is 64 bytes and the computed password is 30 bytes, however alternate formats will be apparent to those of skill in the art.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In a storage area network, a database management system (DBMS) is employed for providing database support. Privileged database accounts that permit substantial freedom for database operations are stored in password protected areas accessible via dedicated accounts using the respective password. Conventional mechanisms store the password in a file accessible to processes that require it. In contrast, in configurations disclosed herein, a dual level authorization is provided to privileged database operations by storing the password file in a secure repository inside the database to which the stored passwords provide access, thus preventing unauthorized access in the event or reverse engineering, cryptography, or other compromise of the password decrypting/decoding logic. A separate database account (i.e. login) is created to afford access to the password repository. The password repository, typically a database table or file, is stored in a secure area accessible only by the specialized password repository account.

A separate password is employed for access to the password repository account. Executable entities, such as processes of the management application, are encoded with the password, or access token, to the password repository account. From the password repository account, the password repository provides availability of the stored passwords for specific privileged access by designated processes. Individual passwords available via the password repository may be further refined in granularity, but are accessible only via the password account. Individual executable entities (i.e. processes) operable for privileged access have embedded logic for both the access token use to access the password repository, and decryption logic for decrypting or decoding the password once obtained from the password repository. Password integrity is therefore preserved by storing the password repository that includes the encrypted passwords in a privileged database area accessible only via the privileged account to the database.

Figure 1:
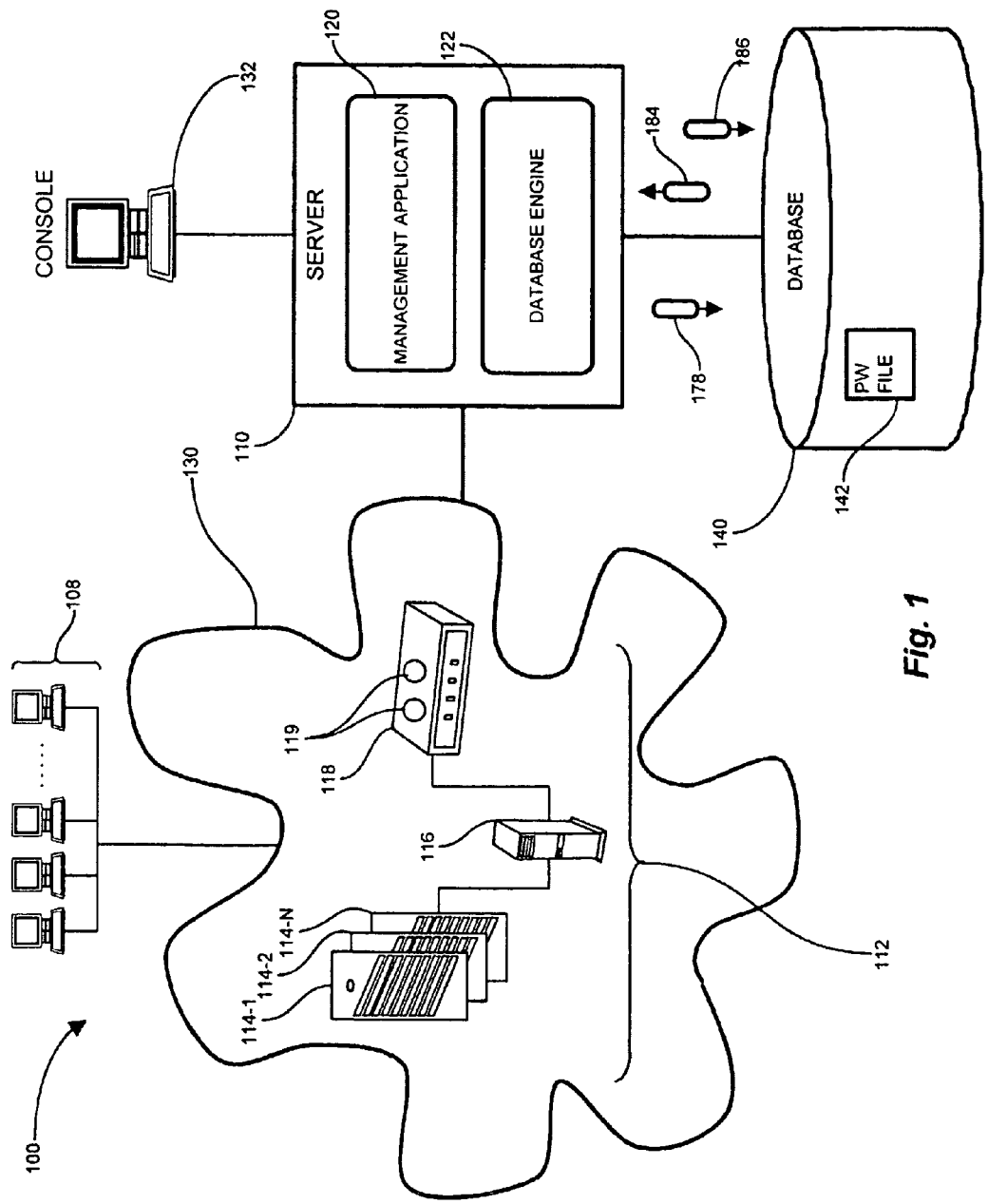
FIG. 1 is a context diagram of an exemplary managed information environment suitable for use with the present invention.

FIG. 1 is a context diagram of an exemplary managed information environment 100 suitable for use with the present invention. Referring to FIG. 1, a SAN management server 110 executes a SAN management application 120 for monitoring and managing information retrieval and storage in a storage area network 130. The storage area network (SAN) 130 includes interconnected devices, or manageable entities 112, operable for providing information storage and retrieval services to a user community 108. The manageable entities 112 include storage devices, such as storage arrays 114, connectivity devices, such as switches 116, host devices, such as host computers 118, and agents 119, for executing instructions responsive to the management application 120 for monitoring and managing the manageable entities 112. The management application 120 is responsive to a console 132 operative to exchange commands and feedback with an operator via a graphical user interface (GUI), not specifically shown.

The management application 120 receives, processes and stores administrative data about the SAN. Information such as performance, capacity and throughput of the various manageable entities 112 is employed for items such as performance reports, trending analysis, and utilization of the SAN resources. The management application 120 stores this information in a database 140. A database engine 122 organizes the data in the database in a normalized form, and provides access control, security and integrity to the data stored thereby. Typically, the database engine 122 is a third party database management system (DBMS) specialized for organizing and indexing such normalized data. In the exemplary configuration, the DBMS may be an Oracle database, available commercially from Oracle Corporation, of Redwood Shores, Calif. Alternate database management schemes may be employed.

As indicated above, the database engine 122 may be a third-party product bundled specifically for use with the management application 120. Accordingly, product licenses typically restrict usage of the database engine 122 for specific uses in conjunction with the management application 120. Certain areas of the database 140 are therefore accessible only by the management application 120 for performing a limited subset of database functionality specific to the management application 120. Appropriate functionality is enabled via database login accounts having specific privileges to perform predetermined database operations. Unlimited access to these privileged accounts enables unlimited database functionality, and could be employed, for example, by an unscrupulous user to circumvent the specific licensed uses of the database engine 122 in conjunction with the management application 120. Access control to the database 140 is therefore is provided by a password file 142 including encrypted passwords to privileged database accounts. Certain privileged applications (processes) in the management application 120 are enabled to perform a login to the password file via a login attempt 178. The management application 120 obtains a password 184 from the password file 142 providing privileged access. Using the password 184, the management application 120 may then perform a privileged operation 186 into the database 140. Further, the password 184 may be stored in the password file 142 in an encrypted form, and invoke decryption by the management application 120 in order to issue an effective privileged operation 186.

Figure 2:
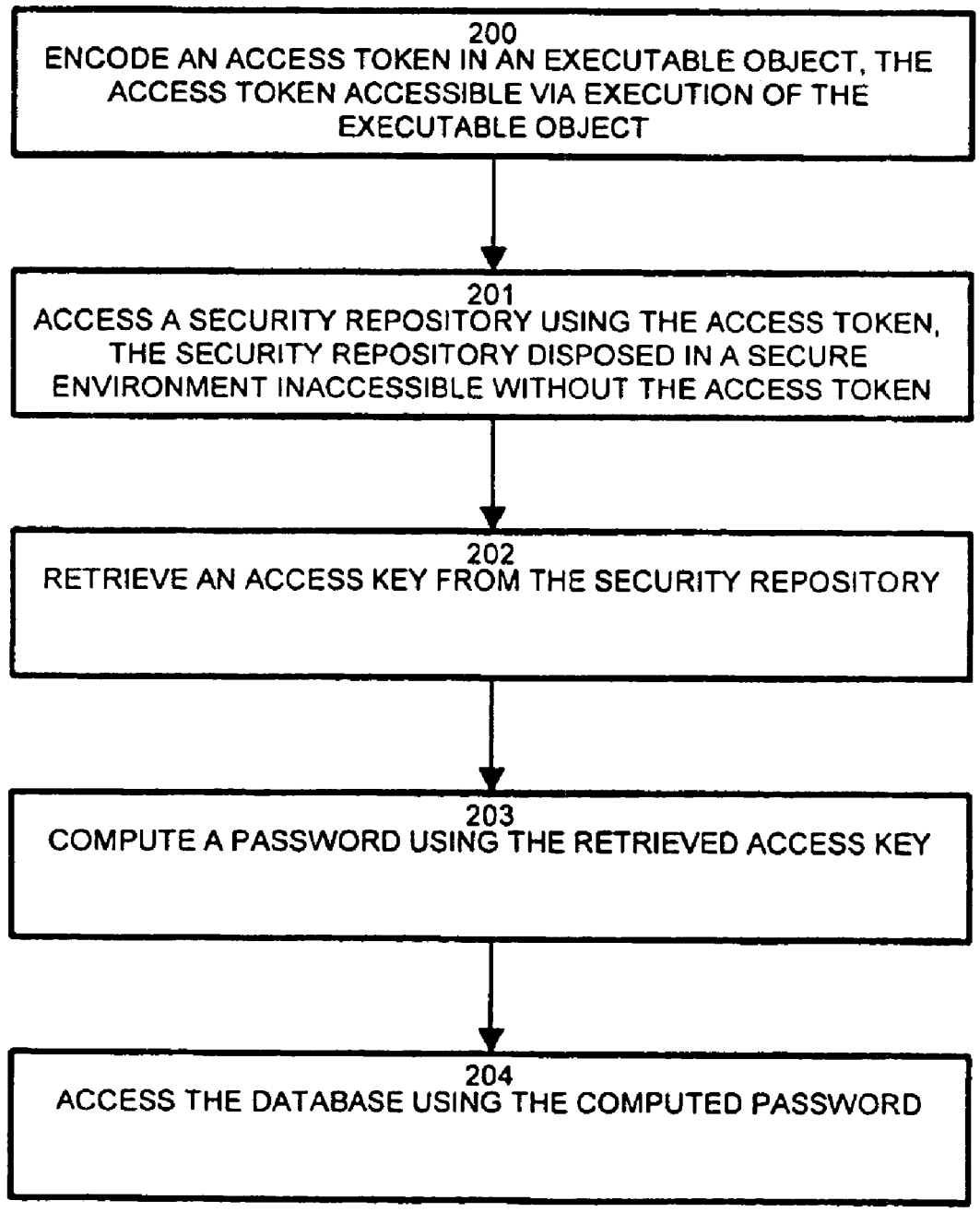
FIG. 2 is a flowchart of password management in the environment of FIG. 1.

FIG. 2 is a flowchart of password management in the environment of FIG. 1. Referring to FIGS. 1 and 2, the method for selective database access in a storage area network 100 disclosed herein includes, at step 200, encoding an access token in an executable object, such that the access token is accessible via execution of the executable object. The access token 178, in the exemplary configuration, is a password embedded in the executable code of a set of instructions such as a process in the management application 120. The executable code accesses a security repository such as the password file 142 using the access token 178, in which the security repository is disposed in a secure environment, such as the database 140, inaccessible without the access token, as depicted at step 201. The executing process issues the password 178 to login to the security repository, and, pending a positive authentication via the password 178, retrieves an access key 184 from the security repository, as shown at step 202.

Upon receiving the password, decryption or decoding instructions in the management application 120 compute a password using the retrieved access key 184, as depicted at step 203. The access key 184 may be bound by a format prescribed by the database engine 122. Accordingly, the database engine 122 authenticates the database 140 access using the resulting computed password 186. In the exemplary configuration, the password is computed via a decryption operation using the access key from the file 142, however alternate mechanisms may be employed, such as retrieving the actual unaltered password directly from the password file 142. The management application 120 then accesses the database using the computed password 186, as depicted at step 204.

Figure 3:
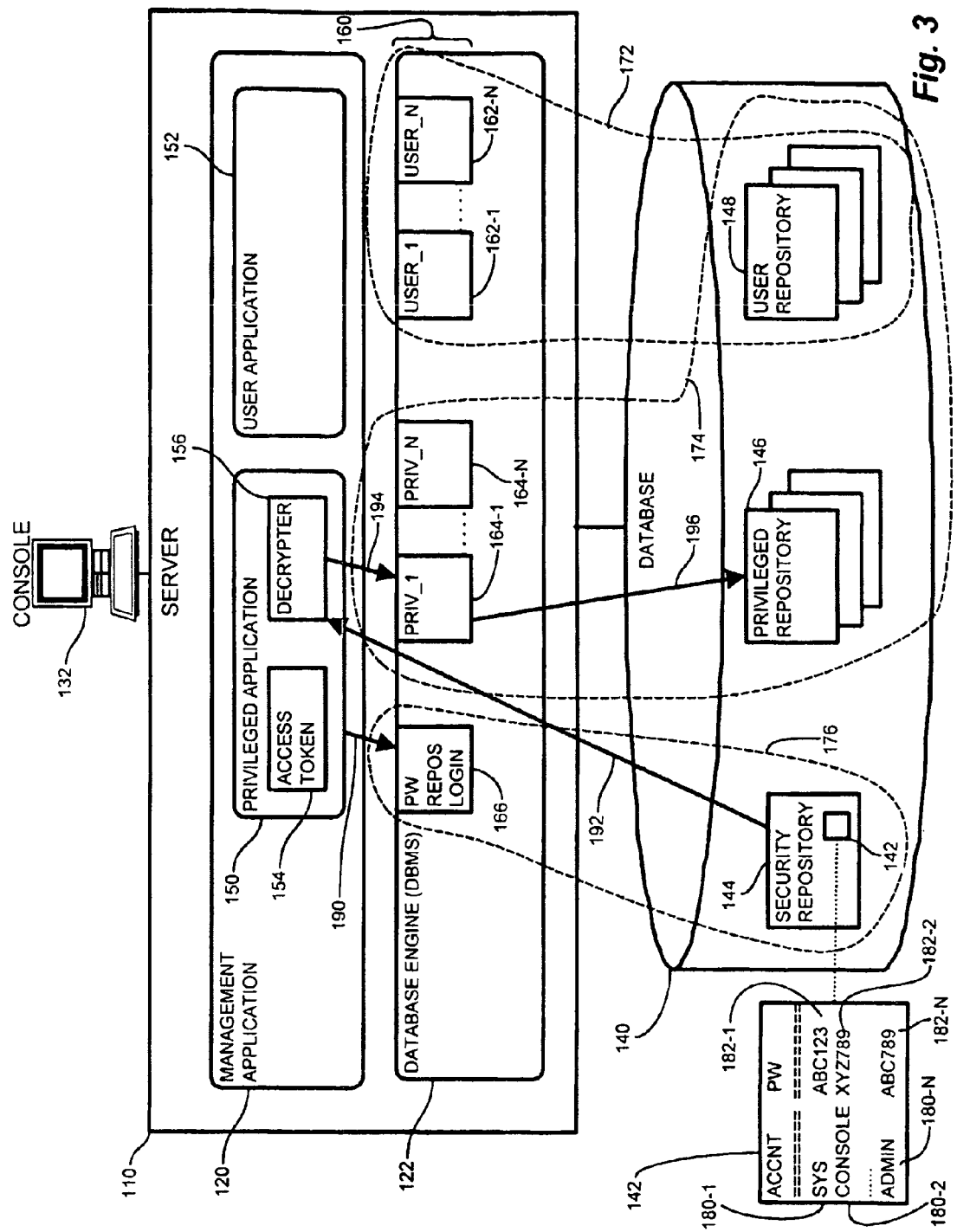
FIG. 3 is a block diagram of database access employing password management as defined herein.

FIG. 3 is a block diagram of database access employing password management as defined herein. Referring to FIGS. 1 and 3, the database 140 includes privileged repositories 146-1 . . . 146-N (146 generally) and user repositories 148-1 . . . 148-N (148 generally). The password file 142 takes the form of a security repository 144, distinct from both the privileged repositories 146 and user repositories 148. User repositories 148 are general database login accounts, while privileged repositories 146 permit access to proprietary and reserved database areas, including those operable to provide operation outside the scope of the intended and/or licensed usage of the database 140. The database engine 122 defines a plurality of accounts 160 for various levels of controlled access to the database 140. User accounts 162-1 . . . 162-N afford general user access to the user repositories 148, shown by dotted line 172. Privileged accounts 164-1 . . . 164-N provide access to the privileged repositories 146, as well as the user repositories 148, as shown by dotted line 174. The password repository login 166 is reserved for access only to the security repository 144 having the password file 142, or table, as shown by dotted line 176. In particular, the password file 144 includes account names 180-1 . . . 180-N (180 generally) of one or more privileged accounts, and corresponding encrypted passwords 182-1 . . . 182-N (182, respectively), or access keys, for accessing the particular named account 180. Thus, particular accounts 180 defined in the password table 142 typically afford access to a particular privileged repository 146 corresponding to the account 180, however these need not be mutually exclusive. The respective privileged accounts 164 are operable to define suitable privileges independent of other accounts 164.

The management application 120 accesses the database 140 via the accounts 160 in the DB engine 122. The management application 120 further includes privileged applications 150 and user applications 152. The privileged applications 150 include an access token 154 and a decrypter 156. The access token 154 is operable to provide access to the password file 142 or other secure repository 144. The access token 154, embedded in privileged applications 150, allows the privileged application 150 to login into the password repository account 166, as shown by arrow 190. In other words, the access token 154 is the password or other authenticator for access to the password repository account 166 for accessing the password table 142. The privileged application 150 uses the password repository account 166 to lookup the encrypted password 182 for the account 180 which the particular privileged process 150 is designated to login under. Each privileged application 150 has a predetermined privileged account 164 that it uses, and each is provided the embedded access token 154 for accessing the password account 166. In the exemplary configuration, the access token 154 is provided by embedded instructions (code) that includes the access token 154.

The privileged application 150 receives the encrypted password 182, as shown by arrow 192, and invokes the decrypter 156 to decrypt the password 184 and produce the unencrypted password (password), shown by arrow 194. In general, database accounts (accounts) 160 provide access control for selected database areas 144, 146, 148. Using the password 194 to login to the respective privileged account 164, the privileged application 150 may then access the respective privileged repository 146 corresponding to the account 164, as shown by arrow 196.

Figure 4:
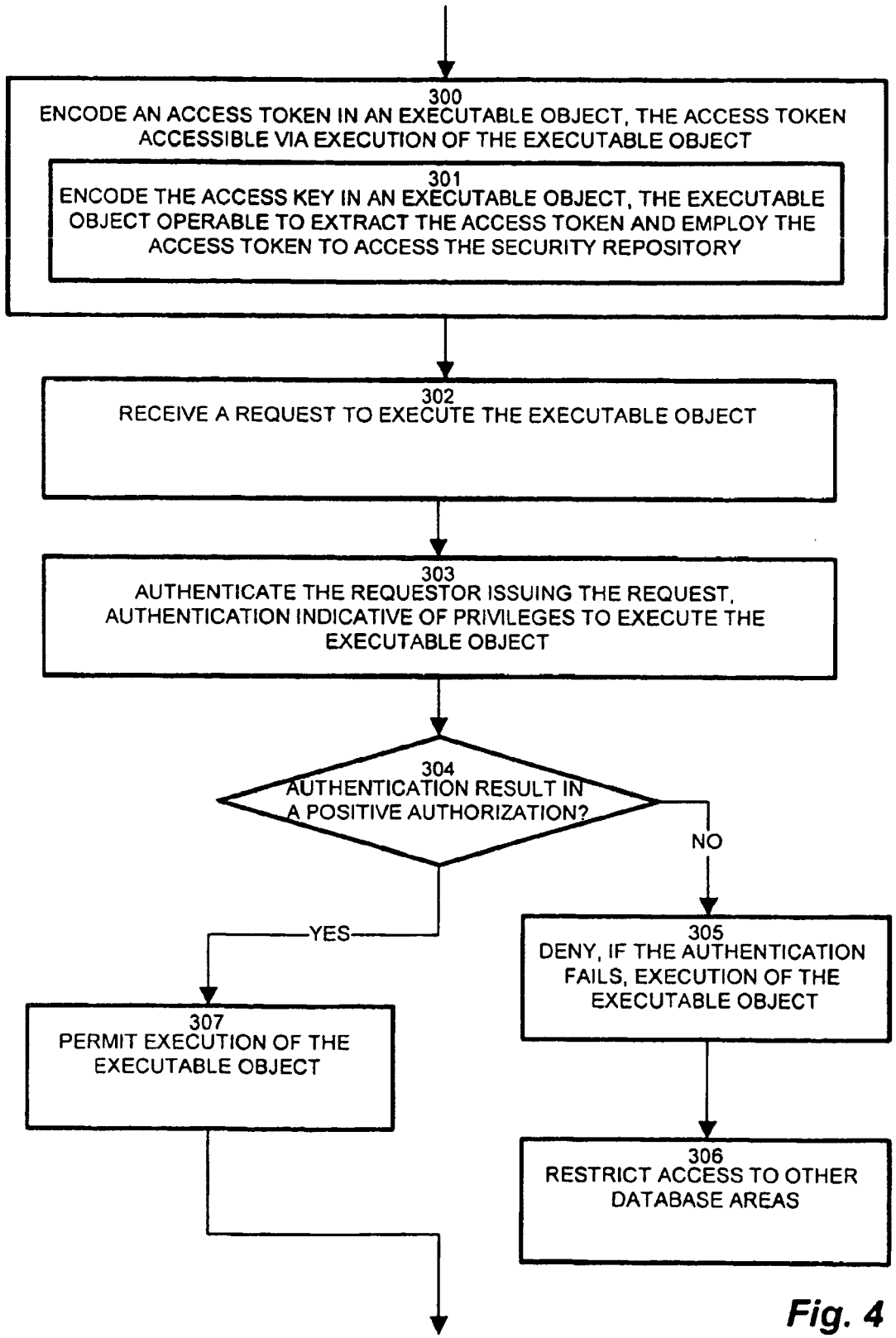
FIGS. 4-6 are a flowchart of password management in the diagram of FIG. 3.
Figure 5:
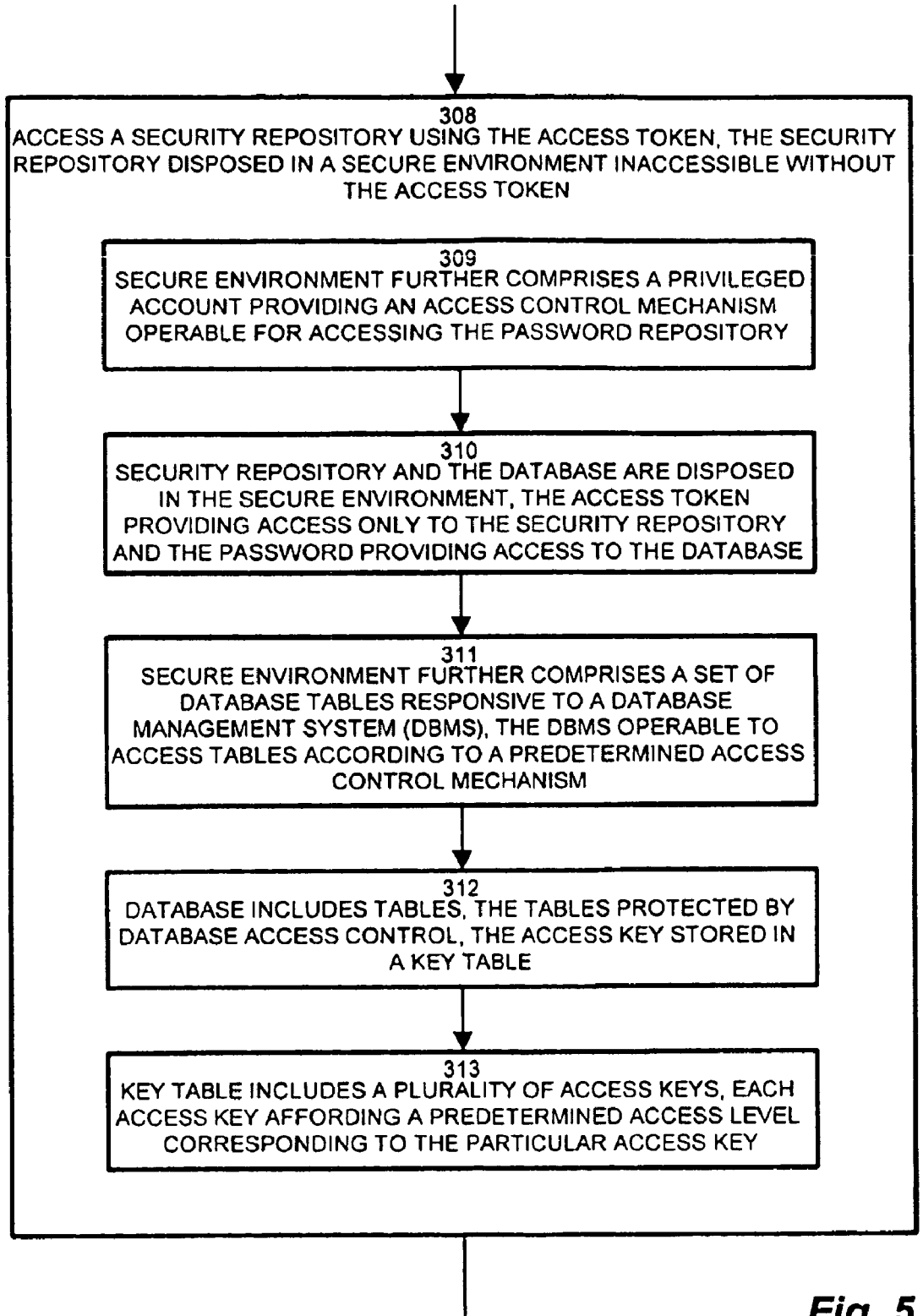
Figure 6:
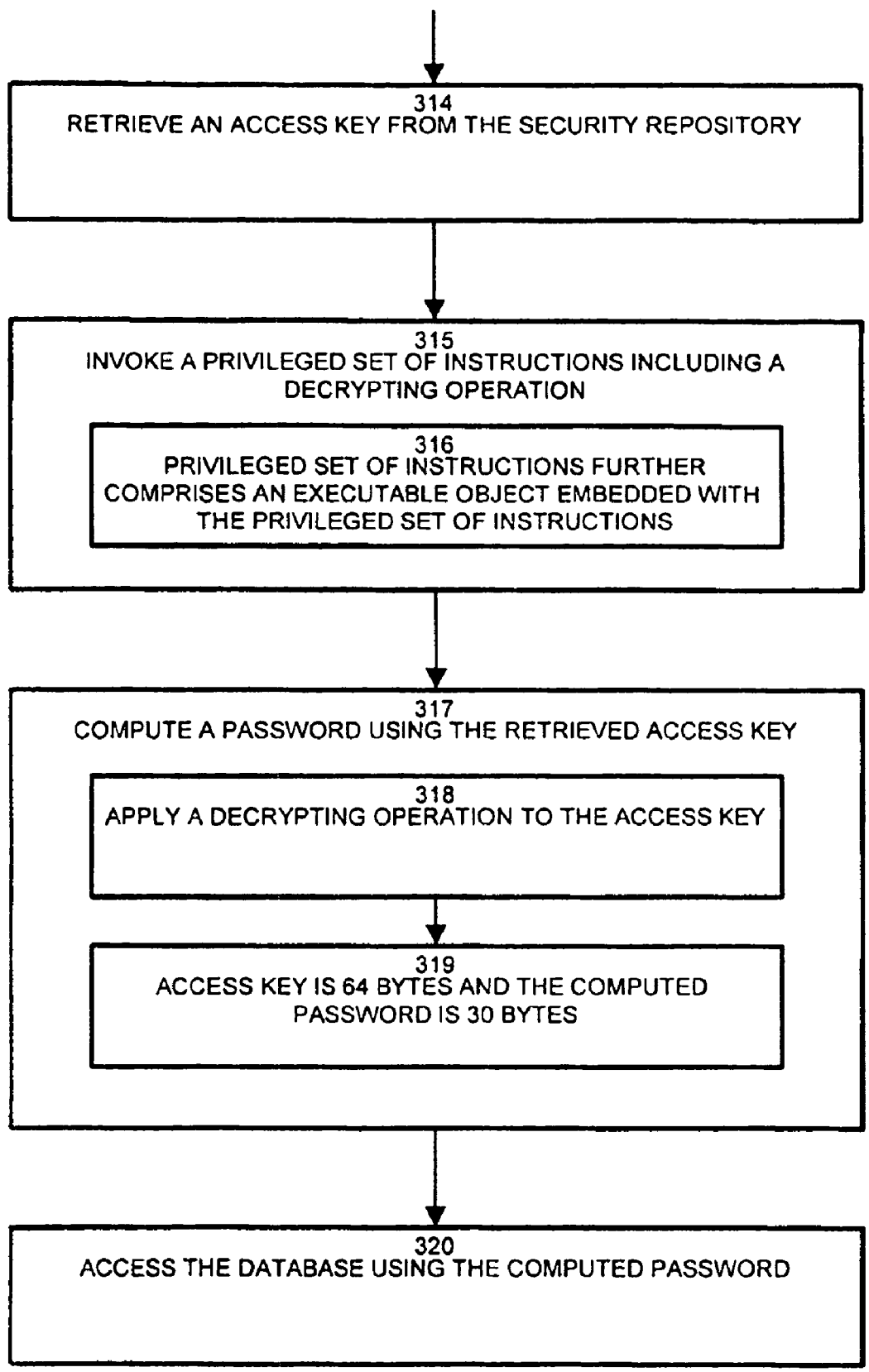

FIG. 4 is a flowchart of password management in the diagram of FIG. 3. Referring to FIGS. 1 and 3-6, an initialization or startup function of the management application 120 instantiates an encoded an access token 154 in an executable object (part of privileged application 150), such that the access token 154 is accessible via execution of the executable object, as depicted at step 300. In the exemplary configuration, this includes encoding the access token 154 in an executable object, in which the executable object is operable to extract the access token 154 and employ the access token 154 to access the security repository 144, as disclosed at step 301. Mechanisms for encoding the access token 154 are apparent to those of skill in the art, and may include, for example, hardcoded constants, string manipulations, and concatenation operations.

The executable object within the management application 120 is selectively operable only with appropriate privileges, thereby preserving the integrity of access control to sensitive database areas such as the privileged repositories 146. Encoding the access token 154 in the executable object ensures that the access token is not obtainable merely by casual inspection or editing, as substantial effort in the way of disassembly or reverse engineering of object or executable code would be required to extract the access token 154. Accordingly, the management application 150 receives a request to execute the executable object, or privileged application 150, as depicted at step 302. The management application 120 authenticates the requestor issuing the request, in which authentication is indicative of privileges to execute the executable object (privileged application) 150, as shown at step 303. A check is performed, at step 304, for the authentication results. The management application denies, if the authentication fails, execution of the executable object, as depicted at step 305. The management application 120 also restricts access to other database areas, such as the privileged repositories 146, as shown at step 306.

If authentication results in a positive authorization, the management application 120 permits execution of the privileged application 150 including the executable object, as shown at step 307. Since the privileged application 150 includes the access token 154, the privileged application 150 accesses the security repository 144 using the access token 154, in which the security repository 144 is disposed in the secure environment (i.e. the database 140) and thus inaccessible without the access token 154, as depicted at step 308 and shown by arrow 190. The secure environment afforded by the database 140 therefore includes an account 166 providing an access control mechanism operable for accessing the password repository, or password file 142, as disclosed at step 309. As the database 140 provides a secure file storage infrastructure, the security repository 144 and the database 140 are disposed in the secure environment provided by the database 140, such that the access token 154 provides access only to the security repository 144 and the password providing access to the database, as depicted at step 310. In other words, the password file 142 constitutes a secure repository 144 having further DB account access control in addition to that afforded the database 140 in general (i.e. a dedicated account).

As discussed above, the secure environment (i.e. database 140) further comprises a set of database tables 144, 146 and 148 responsive to a database management system (DBMS), such that the DBMS 122 is operable to access the tables according to a predetermined access control mechanism, as depicted at step 311. The DB engine 122, therefore maintains an account structure including, but not limited to, a security repository 144, dedicated to password storage, privileged repositories 146, including privileged and/or proprietary files (table), and general user repositories 148, for less sensitive data. Each of the available accounts 166, 164 and 162 corresponds to (i.e. affords access to) respective tables (files). Accordingly, the database defines a set of tables, the tables protected by database access control, the access key stored in a key table 142, as depicted at step 312. The key table 142 includes a plurality of access keys 182, such that each access key affords a predetermined access level corresponding to the particular access key, typically a separate account such as PRIV_1 . . . PRIV_N (164-1 . . . 164-N), as shown at step 313.

Upon login to the password repository account 166, the privileged application 150 retrieves an access key 182 (i.e. encrypted password) from the security repository 144, as depicted at step 314. The privileged application 150 is also encoded with the particular account 180-1 . . . 180-N for which to obtain the access key 182, although alternate configurations may provide different security repositories 144 for various accounts 180. Upon receiving the access key 182, shown by arrow 192, the privileged application 150 invokes the decrypter 156 having a privileged set of instructions including a decrypting operation, as shown at step 315. The privileged set of instructions therefore defines an executable object embedded with the privileged set of instructions for performing the decrypting operation on the access key 182, as shown at step 316. The decrypter 156, therefore, computes the password using the retrieved access key 182 operable to login to one of the privileged accounts 164, as shown at step 317 and arrow 194. The decrypter 156 applies a decrypting operation to the access key 182, as shown at step 318; in the exemplary configuration, the access key is 64 bytes and the computed password is 30 bytes, as depicted at step 319, however alternate encryption and/or encoding schemes may be employed. The resulting password 186 is operable to enable the privileged application 150 to access the database 140 using the computed password 186, as depicted at step 320 and shown by arrow 196.

Those skilled in the art should readily appreciate that the programs and methods for password management in a storage area network as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for password management in a storage area network has been particularly shown and described with references to embodiments thereof, it will be understood by those skilled in the art that various changes in form and details may be made therein without departing from the scope of the invention encompassed by the appended claims.

What is claimed is:

1. A method for selective database access in a storage area network comprising:
   encoding an access token in the executable code of an executable object, wherein the executable object comprises a privileged application of a storage area network (SAN) management application, wherein the access token is accessible via execution of the executable object, and wherein the executable object is configured to extract the access token in response to execution of the executable object and employ the access token to access a security repository;
   accessing the security repository using the access token by executing the executable object to extract the access token, wherein the access token extracted from the executable object provides a password to a password file for accessing the security repository, wherein the access token is an unpublished private key, and wherein the security repository is disposed in a secure environment inaccessible without the access token;
   retrieving an access key from the security repository using the password provided by the access token extracted from the executable object upon execution of the executable object;
   computing a password using the access key retrieved from the security repository; and
   accessing the database using the password computed using the access key retrieved from the security repository.

2. The method of claim 1 wherein the executable object is selectively operable with privileges, the method further comprising:
   receiving a request to execute the executable object;
   authenticating a requestor issuing the request, authentication indicative of privileges to execute the executable object;
   permitting, if authenticating results in a positive authorization, execution of the executable object; and
   denying, if the authentication fails, execution of the executable object.

3. The method of claim 2 wherein the security repository and the database are disposed in the secure environment, the access token providing access only to the security repository and the password providing access to the database.

4. The method of claim 3 wherein the secure environment further comprises a set of database tables responsive to a database management system (DBMS), the DBMS operable to access tables according to a predetermined access control mechanism.

5. The method of claim 1 wherein computing the password further comprises:
   invoking a privileged set of instructions including a decrypting operation; and
   applying the decrypting operation to the access key.

6. The method of claim 1 wherein the secure environment comprises a privileged account providing an access control mechanism operable for:
   accessing the password repository; and
   restricting access to other database areas.

7. The method of claim 1 wherein the access token is a password embedded in the executable code of a set of instructions, the security repository is a password file and the secure environment is the database, and computing the password includes a decryption operation using the access key from the password file.

8. The method of claim 1 wherein accessing the security repository comprises accessing a mapping of users to encrypted passwords, the encrypted passwords corresponding to a database account, the database account having privileges to access tables independent of access afforded to other users.

9. The method of claim 8 further comprising:
   employing the access token for accessing a common repository for accessing the mapping of users to privileged database accounts; and
   employing the mapping defining the encrypted password of the user specific account for access to the privileged repository corresponding to the user.

10. The method of claim 1 wherein access to the privileged password account is available only through the execution of the executable encoded with the access token, and not via interactive login using the password directly such that the password eludes direct control by users.

11. The method of claim 1 wherein the computed password corresponds to a privileged database account, further comprising employing the computed password for accessing the privileged account, the privileged account enabled for performing database operations according to software licensing terms.

12. The method of claim 11 further comprising invoking an application using the computed password for performing database operations according to licensed uses of the database by the accessing account, the application limiting operations for avoiding unlicensed usage.

13. A SAN management server for password management and selective access in a storage area network comprising:
   an encoded access token encoded in the executable code of an executable object, wherein the executable object comprises a process of a storage area network (SAN) management application, wherein the access token is accessible via execution of the executable object, and wherein the executable object is configured to extract the access token in response to execution of the executable object and employ the access token to access a security repository;
   a database engine responsive to the access token and operable to access a security repository using the access token by executing the executable object to extract the access token, wherein the security repository is disposed in a secure environment inaccessible without the access token, wherein the access token extracted from the executable object provides a password to a password file for accessing the security repository, and wherein the access token is an unpublished private key;
   a password repository account operable to retrieve an access key from the security repository using the password provided by the access token extracted from the executable object upon execution of the executable object;
   a decrypter operable to compute a password using the access key retrieved from the security repository; and
   a privileged application operable to access the database using the password computed using the access key retrieved from the security repository, the privileged application including the executable object having the access token, the executable object operable to extract the access token and employ the access token to access the security repository.

14. The server of claim 13 wherein the privileged application is selectively operable with privileges and is further operable to:
   receive a request to execute the executable object;
   authenticate a requestor issuing the request, authentication indicative of privileges to execute the executable object;
   permit, if authenticating results in a positive authorization, execution of the executable object; and
   deny, if the authentication fails, execution of the executable object.

15. The server of claim 14 wherein the security repository and the database are disposed in the secure environment, the access token providing access only to the security repository and the password providing access to the database, the secure environment further comprising a set of database tables responsive to a database management system (DBMS), the DBMS operable to access tables according to a predetermined access control mechanism.

16. The server of claim 14 wherein the secure environment comprises a privileged account providing an access control mechanism operable to:
   access the password repository; and
   restrict access to other database areas.

17. The server of claim 13 wherein the executable object is further operable to:
   invoke a privileged set of instructions including a decrypting operation; and
   apply the decrypting operation to the access key to compute the password.

18. The server of claim 17 wherein the privileged set of instructions further includes a privileged application including an executable object embedded with the privileged set of instructions.

19. The server of claim 18 wherein the database includes tables, the tables protected by database access control, the access key stored in a key table, the key table operable to include a plurality of access keys, each access key affording a predetermined access level corresponding to the particular access key.

20. A computer program product stored on a non-transitory computer readable storage medium, the non-transitory computer readable storage medium operable to store computer program logic embodied in computer program code encoded thereon, for password based selective database access in a storage area network comprising:
   computer program code for encoding an access token in the executable code of an executable object, wherein the executable object comprises a privileged application of a storage area network (SAN) management application, wherein the access token is accessible via execution of the executable object, and wherein the executable object is configured to extract the access token in response to execution of the executable object and employ the access token to access a security repository;
   computer program code for accessing the security repository using the access token by executing the executable object to extract the access token, wherein the access token extracted from the executable object provides a password to a password file for executing the security repository, wherein the access token is an unpublished private key, wherein the security repository is disposed in a secure environment inaccessible without the access token; and wherein the secure environment further comprises a privileged account providing an access control mechanism operable to:
   access the password repository; and
   restrict access to other database areas;
   computer program code for retrieving an access key from the security repository using the password provided by the access token extracted from the executable object upon execution of the executable object;
   computer program code for invoking a privileged set of instructions including a decrypting operation;
   computer program code for computing a password using the access key retrieved from the security repository by applying the decrypting operation to the access key to computer the password; and
   computer program code for accessing the database using the password computed using the access key retrieved from the security repository.

* * * * *